United States Patent
Hashimoto

(10) Patent No.: US 8,743,182 B2
(45) Date of Patent: Jun. 3, 2014

(54) MULTI-EYE PHOTOGRAPHING APPARATUS AND PROGRAM THEREOF

(75) Inventor: Takashi Hashimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 209 days.

(21) Appl. No.: 13/072,260

(22) Filed: Mar. 25, 2011

(65) Prior Publication Data
US 2011/0234766 A1   Sep. 29, 2011

(30) Foreign Application Priority Data
Mar. 29, 2010 (JP) .................................. 2010-075546

(51) Int. Cl.
H04N 13/02   (2006.01)
(52) U.S. Cl.
USPC ................................. 348/47; 382/154; 348/42
(58) Field of Classification Search
USPC ..................................................... 348/42–60
See application file for complete search history.

(56) References Cited

U.S. PATENT DOCUMENTS

| | | | |
|---|---|---|---|
| 6,263,100 B1 * | 7/2001 | Oshino et al. .................. | 382/154 |
| 6,361,438 B1 * | 3/2002 | Morihira .......................... | 463/31 |
| 7,488,078 B2 * | 2/2009 | Kondo et al. .................... | 353/94 |
| 2003/0151659 A1 | 8/2003 | Kawano et al. | |
| 2004/0067040 A1 * | 4/2004 | Kondo et al. ....................... | 386/4 |
| 2004/0247175 A1 * | 12/2004 | Takano et al. .................. | 382/154 |
| 2005/0253924 A1 * | 11/2005 | Mashitani ....................... | 348/42 |

FOREIGN PATENT DOCUMENTS

| | | |
|---|---|---|
| JP | 2002-341473 A | 11/2002 |
| JP | 2003244500 A | 8/2003 |
| JP | 2004-236156 A | 8/2004 |
| JP | 2005037517 A | 2/2005 |
| JP | 2006033476 A | 2/2006 |
| JP | 2009232276 A | 10/2009 |

OTHER PUBLICATIONS

Notice of Reasons for Rejection, dated May 14, 2013, issued in corresponding JP Application No. 2010-075546, 9 pages in English and Japanese.

* cited by examiner

*Primary Examiner* — Dave Czekaj
*Assistant Examiner* — Md Haque
(74) *Attorney, Agent, or Firm* — Sughrue Mion, PLLC

(57) ABSTRACT

When the distance to an object is short and a release button is fully-pushed, one photographing unit acquires a left image. Translucence-processing is performed for the left image, and an optimum movement distance of a viewpoint between left and right images is calculated. The left image objected to the translucence-processing and the calculated optimum movement distance are superimposingly displayed on a live view image of a liquid crystal monitor, and the correlation coefficient of an object region and a background region are calculated for the live view image and the acquired left image. It is determined whether or not the correlation coefficient of the object region is equal to or greater than a first threshold value and whether or not the correlation coefficient of the background region is equal to or greater than a second threshold value, and if the threshold value determination is positive, one photographing unit acquires the right image.

9 Claims, 7 Drawing Sheets

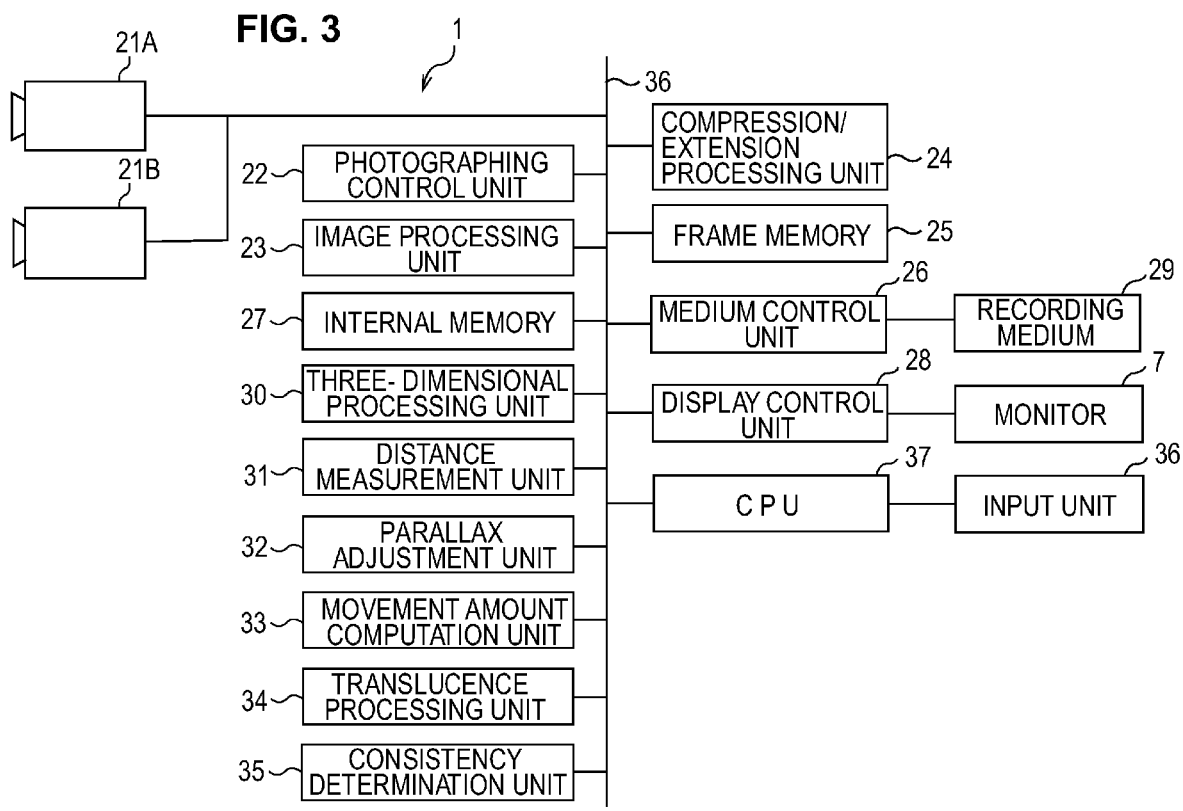

MULTI-EYE PHOTOGRAPHING APPARATUS AND PROGRAM THEREOF

BACKGROUND OF THE INVENTION

1. Field of the Invention

The present invention relates to a multi-eye photographing apparatus and a program thereof, and in particular, to a multi-eye photographing apparatus which captures images for displaying a stereoscopic view, and a program thereof.

2. Description of the Related Art

In the related art, a stereoscopic image capturing auxiliary device is known in which a 3D image is created by using a camera platform and a rail (JP2004-236156A). In the stereoscopic image capturing auxiliary device, the camera platform is moved bilateral-symmetrically from the center of the rail, enabling stable photographing.

A stereoscopic image capturing method is also known in which photographing is carried out multiple time in a state where the focal distance is deviated with respect to an object (JP2002-341473A). In the stereoscopic image capturing method, an image other than an image having the longest focal distance is printed on a transparent member, and a predetermined interval is maintained from an image having a short focal distance, thereby viewing a stereoscopic image.

SUMMARY OF THE INVENTION

However, according to the technique described in JP2004-236156A, there is a problem in that it is necessary to provide a special device for photographing, and images for displaying a stereoscopic view may not be simply captured.

According to the technique described in JP2002-341473A, there is a problem in that, if printing is not carried out, display in stereoscopic view may not be performed.

The invention has been finalized in order to solve the above-described problems, and an object of the invention is to provide a multi-eye photographing apparatus which has a simple configuration and includes photographing units with two or more lenses capable of capturing images for displaying a stereoscopic view, and a program thereof.

In order to achieve the above-described object, the invention provides a multi-eye photographing apparatus. The multi-eye photographing apparatus includes a photographing unit which captures a plurality of images from a plurality of different viewpoints, a first photographing control unit which controls the photographing unit so as to capture a first image for displaying a stereoscopic view from one viewpoint among the plurality of viewpoints, a distance measurement unit which measures the distance from an object in the first image, a movement distance calculation unit which calculates, on the basis of the distance from the object measured by the distance measurement unit, the movement distance of the viewpoint between a first image and a second image for displaying the stereoscopic view on the basis of the first image and the second image, which is captured from the one viewpoint as a viewpoint different from the first image, and a display control unit which controls such that, as guidance information for guiding the capturing of the second image, an instruction to move the photographing unit is displayed on a live view image, which is displayed by a display unit displaying images, on the basis of the movement distance of the viewpoint calculated by the movement distance calculation unit.

The invention provides a program. The program causes a computer to function as a first photographing control unit which controls a photographing unit, which captures a plurality of images from a plurality of different viewpoints, to capture a first image for displaying a stereoscopic view from one viewpoint among the plurality of viewpoints, a distance measurement unit which measures the distance from an object in the first image, a movement distance calculation unit which calculates, on the basis of the distance from the object measured by the distance measurement unit, the movement distance of the viewpoint between a first image and a second image for displaying the stereoscopic view on the basis of the first image and the second image, which is captured from the one viewpoint as a viewpoint different from the first image, and a display control unit which controls such that, as guidance information for guiding the capturing of the second image, an instruction to move the photographing unit is displayed on a live view image, which is displayed by a display unit displaying images, on the basis of the movement distance of the viewpoint calculated by the movement distance calculation unit.

According to the invention, the first photographing control unit controls the photographing unit to capture the first image for displaying a stereoscopic view from one viewpoint among a plurality of viewpoints. The distance measurement unit measures the distance to the object in the first image, and the movement distance calculation unit calculates, on the basis of the distance from the object measured by the distance measurement unit, the movement distance of the viewpoint between the first image and the second image for displaying a stereoscopic view on the basis of the first image and the second image, which is captured from the one viewpoint as a viewpoint different from the first image.

The display control unit controls such that, as guidance information for guiding the capturing of the second image, an instruction to move the photographing unit is displayed on a live view image, which is displayed by a display unit displaying images, on the basis of the movement distance of the viewpoint calculated by the movement distance calculation unit. The term "instruction" used herein refers to, for example, the movement direction and the movement distance for moving the multi-eye photographing apparatus to the optimum position or only information regarding the direction for moving the multi-eye photographing apparatus indicated by an arrow.

As described above, as the guidance information for guiding the capturing of the second image, for example, the optimum movement distance between the first image and the second image is displayed on the live view image, making it possible to achieve a simple configuration and to capture images for displaying the stereoscopic view.

The display control unit may control such that, as the guidance information, the first image objected to translucence processing is further displayed on the live view image. Therefore, it is possible for the user to recognize the movement distance from the first image.

The multi-eye photographing apparatus may further include a current movement distance calculation unit which calculates the movement distance between the viewpoint and the current viewpoint in the first image on the basis of the first image and the current live view image. The display control unit may control such that, as the guidance information, the difference between the current movement distance calculated by the current movement distance calculation unit and the movement distance of the viewpoint calculated by the movement distance calculation unit or the difference between the movement distance of the viewpoint and the current movement distance is displayed on the live view image. Therefore, it is possible for the user to recognize the difference between the optimum movement distance between the first image and the second image and the current movement distance.

The multi-eye photographing apparatus may further include a correlation information calculation unit which calculates correlation information between an object portion in the first image and an object portion in the live view image, and calculates correlation information between a background portion different from the object portion in the first image and a background portion in the live view image, and a second photographing control unit which, when the correlation information between the object portions calculated by the correlation information calculation unit is equal to or greater than a first threshold value and the correlation information between the background portions is equal to or smaller than a second threshold value, controls the photographing unit to capture the second image. Therefore, it is possible to automatically carry out second photographing.

The multi-eye photographing apparatus including the second photographing control unit may further include a horizontal direction determination unit which determines a horizontal direction in the first image. The correlation information calculation unit may calculate the correlation information in the horizontal direction determined by the horizontal direction determination unit. In this way, with the use of the correlation information in the horizontal direction, it is possible to ease the conditions for second photographing without damaging the stereoscopic effect of display in stereoscopic view.

The display unit may display the first image and the second image in stereoscopic view.

The multi-eye photographing apparatus may further include a distance measurement unit which measures distance information to an object in each of the plurality of images, and a third photographing control unit which, when the measured distance information is equal to or greater than a threshold value, causes the photographing unit to capture the plurality of images from the plurality of viewpoints. When the measured distance information is smaller than the threshold value, the first photographing control unit may control the photographing unit to capture the first image, and when the first image is captured, the display control unit may control such that the guidance information is displayed on the live view image, which is displayed by the display unit. Therefore, it is possible to switch photographing using multiple lenses and photographing using a single lens in accordance with the distance to the object.

The display unit may display the plurality of images or the first image and the second image captured by the photographing unit in stereoscopic view.

As described above, according to the invention, guidance information for guiding second photographing is displayed on a live view image, making it possible to achieve a simple configuration and to capture images for displaying a stereoscopic view.

BRIEF DESCRIPTION OF THE DRAWINGS

FIG. 3 is a schematic block diagram showing the internal configuration of a multi-eye digital camera of this embodiment.

DESCRIPTION OF THE PREFERRED EMBODIMENTS

Hereinafter, embodiments of the invention will be described in detail with reference to the drawings. In the embodiments, a case will be described where a multi-eye photographing apparatus of the invention is applied to a multi-eye digital camera.

Figure 1:
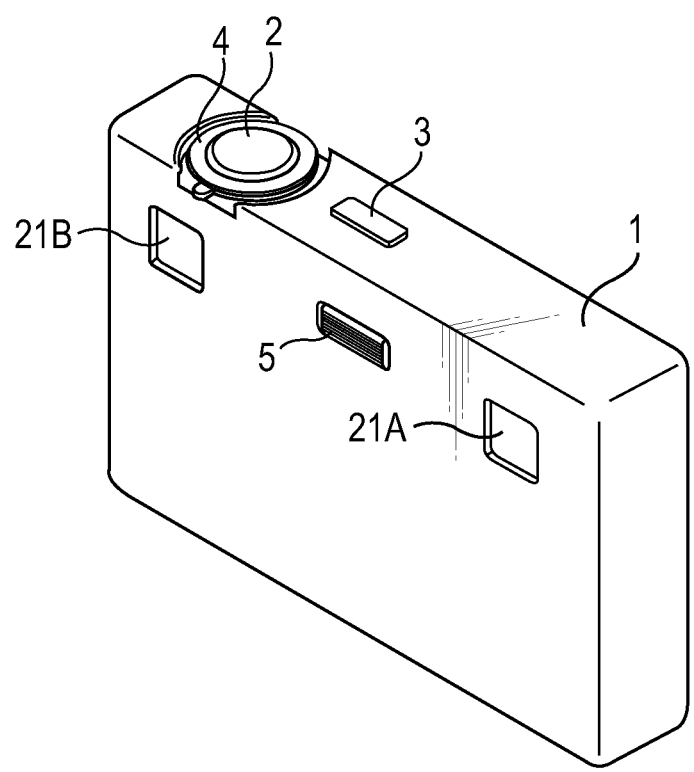
FIG. 1 is a front perspective view of a multi-eye digital camera of this embodiment.
Figure 2:
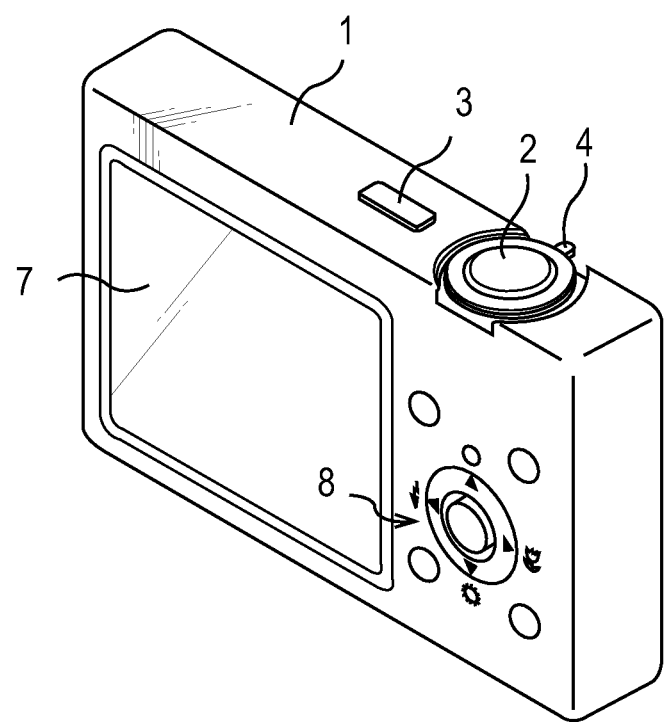
FIG. 2 is a rear perspective view of a multi-eye digital camera of this embodiment.

FIG. 1 is a front perspective view of a multi-eye digital camera 1 according to a first embodiment. FIG. 2 is a rear perspective view. As shown in FIG. 1, in the upper part of the multi-eye digital camera 1, a release button 2, a power button 3, and a zoom lever 4 are provided. On the front of the multi-eye digital camera 1, a flash 5 and lenses of two photographing units 21A and 21B are provided. On the rear of the multi-eye digital camera 1, a liquid crystal monitor 7 which performs various kinds of display and various operation buttons 8 are provided.

FIG. 3 is a schematic block diagram showing the internal configuration of the multi-eye digital camera 1. As shown in FIG. 3, the multi-eye digital camera 1 includes two photographing units 21A and 21B, a photographing control unit 22, an image processing unit 23, a compression/extension processing unit 24, a frame memory 25, a medium control unit 26, an internal memory 27, a display control unit 28, an input unit 36, and a CPU 37. The photographing units 21A and 21B are arranged such that a predefined base line is obtained with a convergence angle at which an object is viewed. Information regarding the convergence angle and the base line is stored in the internal memory 27.

The photographing control unit 22 has an AF processing unit and an AE processing unit (not shown). The AF processing unit determines a focusing region on the basis of pre images obtained by the photographing units 21A and 21B by half push operation of the release button 2, determines the focal positions of the lenses, and outputs the focusing region and the focal positions to the photographing units 21A and 21B. The AF processing unit determines the focal position of the lens with an object region as the focusing region and determines the focal position of the lens for processing described below with a background region different from the object region as the focusing region. The object region and the background region are specified by known image recognition processing in the related art. The AE processing unit determines an aperture value and a shutter speed on the basis of the pre images and outputs the aperture value and the shutter speed to the photographing units 21A and 21B.

The photographing control unit 22 instructs normal photographing by a full push operation of the release button 2 such that, in a multi-eye mode described below, the photographing unit 21A captures the normal image of a left image and the photographing unit 21B captures the normal image of a right image and such that, in a single eye mode described below, the photographing unit 21A captures the normal image of a left image. Before the release button 2 is operated, the photographing control unit 22 instructs the photographing units 21A and 21B to sequentially acquire a live view image having a smaller number of pixels than the normal image at a predetermined time interval (for example, an interval of 1/30 seconds) so as to confirm a photographing range.

The image processing unit 23 performs image processing, such as processing for adjusting white balance, gradation correction, sharpness correction, and color correction, for digital image data of the left and right images acquired by the photographing units 21A and 21B.

The compression/extension processing unit 24 performs compression processing for image data representing the left and right images processed by the image processing unit 23 in a compression format of, for example, JPEG or the like to generate an image file for stereoscopic view. The image file for stereoscopic view includes image data of the left and right images, and stores incidental information, such as the base line, the convergence angle, and the photographing date, and viewpoint information representing a viewpoint position on the basis of an Exif format or the like.

The frame memory 25 is a work memory which is used when various kinds of processing including the above-described processing in the image processing unit 23 are performed on image data representing the left and right images acquired by the photographing units 21A and 21B.

The medium control unit 26 accesses a recording medium 29 and controls writing and reading of an image file or the like.

The internal memory 27 stores various constants which are set in the multi-eye digital camera 1, a program which is executed by the CPU 37, and the like.

The display control unit 28 controls the liquid crystal monitor 7 to display an image for displaying a stereoscopic view generated from the left and right images stored in the frame memory 25 at the time of photographing or controls the liquid crystal monitor 7 to display the left and right images or an image for displaying the stereoscopic view recorded in the recording medium 29. The display control unit 28 controls the liquid crystal monitor 7 to display a live view image.

The multi-eye digital camera 1 includes a three-dimensional processing unit 30, a distance measurement unit 31, a parallax adjustment unit 32, a movement amount computation unit 33, a translucence processing unit 34, and a consistency determination unit 35.

The three-dimensional processing unit 30 performs three-dimensional processing for the left and right images to generate an image for displaying the stereoscopic view such that the left and right images are displayed on the monitor 7 in stereoscopic view. For example, feature points are obtained for the left image and the right image and associated with each other, and parallax amount adjustment is carried out, thereby generating an image for displaying the stereoscopic view.

The distance measurement unit 31 measures the distance to the object on the basis of the lens focal position of the object region obtained by the AF processing unit of the photographing control unit 22 and measures the distance to the background on the basis of the lens focal position of the background region.

The parallax adjustment unit 32 calculates the difference between the pixel positions in the lateral direction of the left image and the right image of the object in both the left image and the right image as a parallax, and performs parallax adjustment processing to superimpose the left image and the right image on the basis of the calculated parallax such that the positions correspond to each other.

The movement amount computation unit 33 computes an optimum movement distance for displaying the stereoscopic view between the viewpoint of the left image and the viewpoint of the right image at the time of photographing in the single eye mode on the basis of the distance to the object and the distance to the background measured by the distance measurement unit 31. As the method of calculating the optimum movement distance, a known method in the related art may be used. At this time, the interval between the eyes of a person, the observation distance of the monitor 7, the actual width of the monitor 7, the interval between the photographing units 21A and 21B, the viewing angle of the lens of each of the photographing units 21A and 21B may be obtained in advance and used as parameters to compute the optimum movement distance.

The translucence processing unit 34 performs translucence processing for the left image captured in the single eye mode.

Figure 4A:
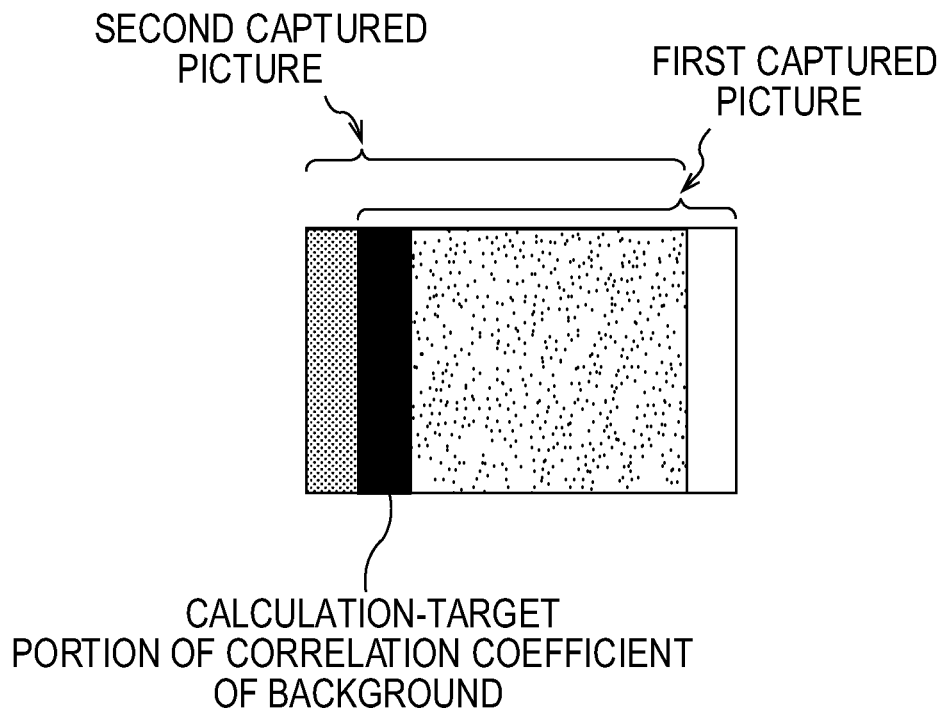
FIG. 4A is a diagram showing a calculation-target portion of a correlation coefficient in a background region when a camera is moved right.
Figure 4B:
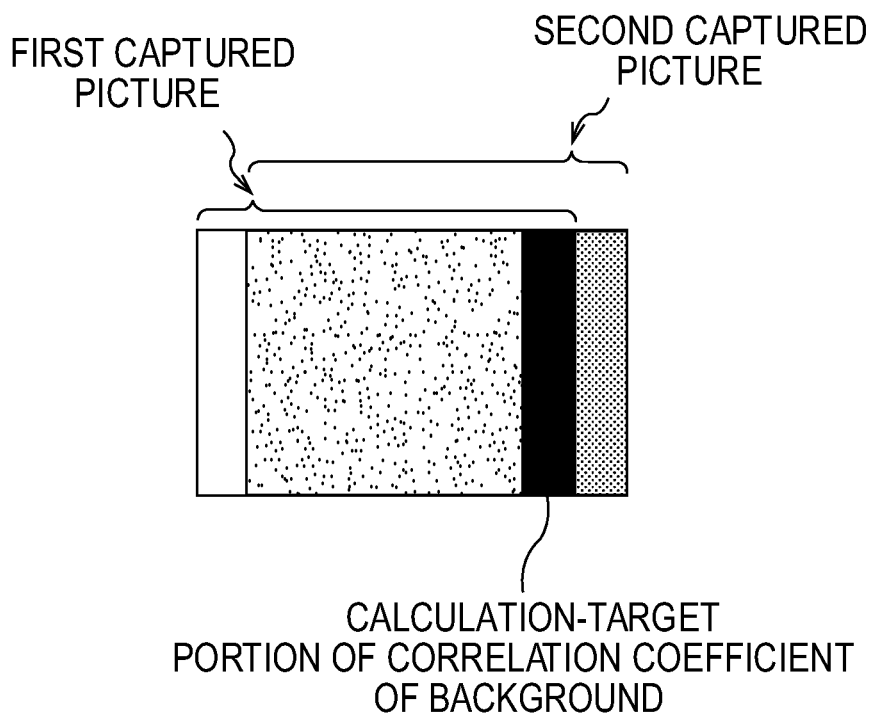
FIG. 4B is a diagram showing a calculation-target portion of a correlation coefficient in a background region when a camera is moved left.

The consistency determination unit 35 performs differential processing (for example, Laplacian processing) for the left image captured in the single eye mode and the live view image, calculates the correlation coefficient between the object regions of the left image and the live view image objected to the differential processing, and calculates the correlation coefficient between the background regions of the left image and the live view image. With regard to a calculation-target portion in calculating the correlation coefficient of the background region, as shown in FIG. 4A, when the camera is moved right after first photographing, a left-end portion of the first captured image is set as a calculation-target portion. As shown in FIG. 4B, when the camera is moved left after first photographing, a right-end portion of the first captured image is set as a calculation-target portion. Determination on whether the camera is moved right or left may be made in accordance with whether the object region is moved left or right.

When the calculated correlation coefficient of the object region is equal to or greater than a first threshold value and the calculated correlation coefficient of the background region is equal to or smaller than a second threshold value, the consistency determination unit 35 instructs the photographing control unit 22 to capture the right image. Thus, the photographing control unit 22 instructs the photographing unit 21A to perform normal photographing to capture the normal image of the right image.

The consistency determination unit 35 is an example of a correlation information calculation unit.

Figure 5:
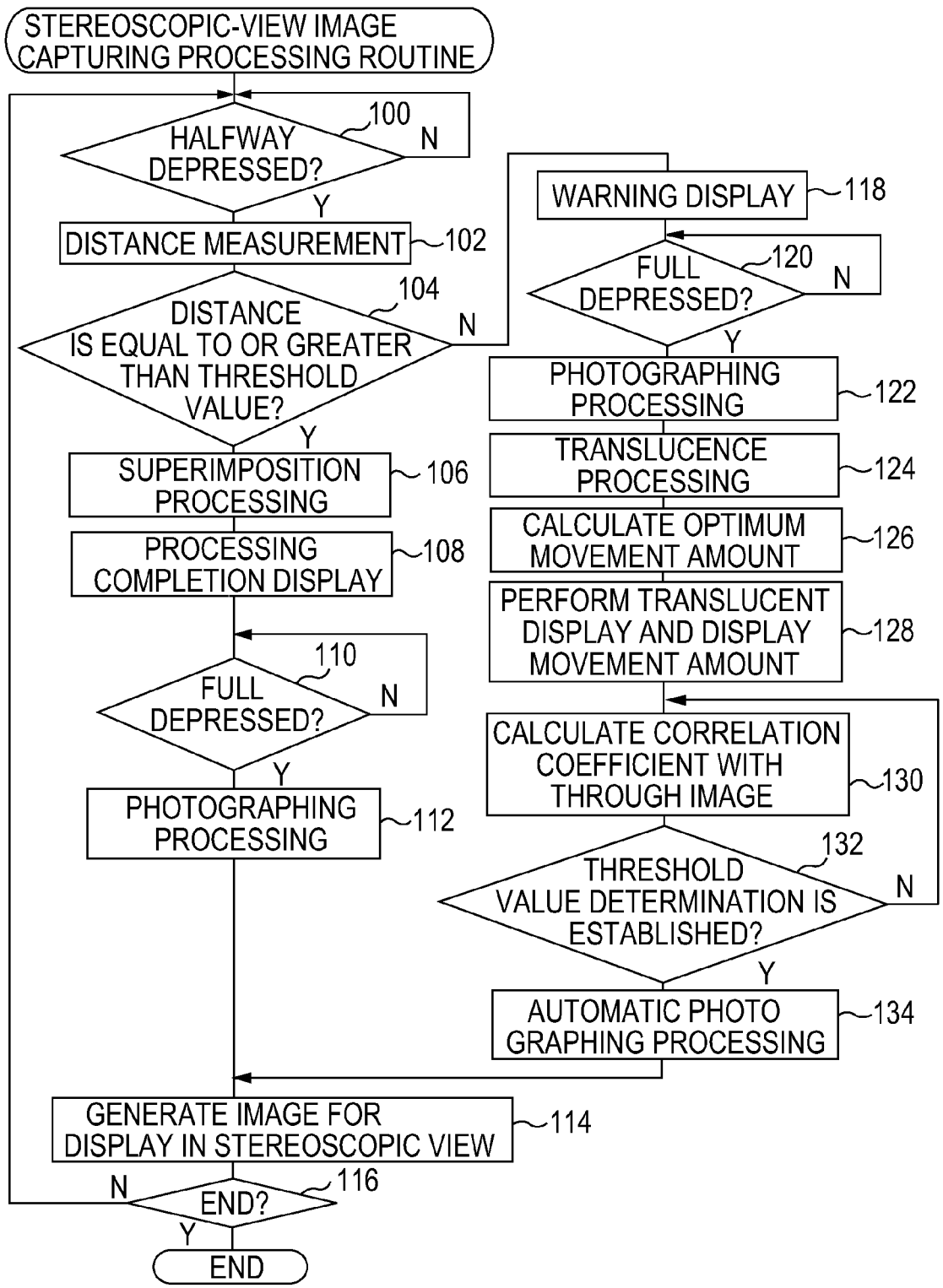
FIG. 5 is a flowchart showing the content of a stereoscopic-view image photographing processing routine according to a first embodiment.

Next, a stereoscopic-view image photographing processing routine in the multi-eye digital camera 1 of the first embodiment will be described with reference to FIG. 5.

In Step 100, it is determined whether or not the release button 2 is half pushed. When the user half pushes the release button 2, the process progresses to Step 102. At this time, the focal position the lens is determined by the AF processing unit of the photographing control unit 22, and the aperture value and the shutter speed are determined by the AE processing unit.

In Step 102, the focal position of the lens of the object region and the focal position of the lens of the background region determined by the AF processing unit are acquired, and the distance to the object and the distance to the background are measured.

In Step 104, it is determined whether or not the distance to the object measured in Step 102 is equal to or greater than a threshold value. With regard to the threshold value, the distance of the object in each of the right image and the left image whose parallax can be adjusted may be experimentally or statistically obtained and the threshold value may be set on the basis of the obtained distance. In Step 104, when the distance to the object is equal to or greater than the threshold value, in the multi-eye mode in which the photographing units 21A and 21B capture the left image and the right image simultaneously, it is determined that an image for displaying the stereoscopic view can be captured. In Step 106, a parallax is calculated from the pre images acquired by the photographing units 21A and 21B, and superimposition processing is performed. If the superimposition processing is completed, in Step 108, a message indicating processing completion is displayed on the monitor 7. Thus, the user can know that a photographable state is reached.

In Step 110, it is determined whether or not the release button 2 is full pushed. When the user full pushes the release button 2, the process progresses to Step 112.

In Step 112, an instruction of normal photographing is issued such that the photographing unit 21A captures the normal image of the left image and the photographing unit 21B captures the normal image of the right image, and the left image and the right image captured by the photographing units 21A and 21B are acquired. In Step 114, an image for display in stereoscopic image is generated on the basis of the left image and the right image, and stored in the recording medium 29.

In Step 116, it is determined whether or not photographing ends. When photographing does not end, the process returns to Step 100, and next photographing is prepared. Meanwhile, when photographing ends, the stereoscopic-view image photographing processing routine ends.

In Step 104, when it is determined that the distance to the object is smaller than the threshold value, the distance to the object is short, and it is determined that, in the multi-eye mode, the image for displaying the stereoscopic view cannot be captured. In Step 118, a warning message indicating that, in the multi-eye mode, the image for displaying the stereoscopic view cannot be captured and photographing is carried out in the single eye mode in which photographing is carried out twice by one photographing unit is displayed on the liquid crystal monitor 7.

In Step 120, it is determined whether or not the release button 2 is full pushed. When the user full pushes the release button 2, the process progresses to Step 122.

In Step 122, an instruction of normal photographing is issued such that the photographing unit 21A captures the normal image of the left image, and the left image captured by the photographing unit 21A is acquired. Next, in Step 124, translucence processing is performed for the left image acquired in Step 122. In Step 126, the optimum movement distance of the viewpoint between the left image and the right image is calculated on the basis of the distance to the object and the distance to be background acquired in Step 102.

In Step 128, the left image subjected to the translucence processing and the calculated optimum movement distance are superimposingly displayed on the live view image of the liquid crystal monitor 7. Next, in Step 130, the current live view image is acquired from the photographing unit 21A, and differential processing is performed for the current live view image and the left image acquired in Step 122, thereby calculating the correlation coefficient of the object region and the correlation coefficient of the background region.

In Step 132, it is determined whether or not the correlation coefficient of the object region calculated in Step 130 is equal to or greater than the first threshold value and the correlation coefficient of the background region is equal to or smaller than the second threshold value. When the threshold value determination is negative, the process returns to Step 130. Meanwhile, if the threshold value determination is positive, in Step 134, an instruction of normal photographing is issued such that the photographing unit 21A captures the normal image of the right image, and the right image captured by the photographing unit 21A. Next, the process progresses to Step 114.

As described above, according to the multi-eye digital camera of the first embodiment, as the guidance information for guiding the capturing of the second right image, the first right image subjected to the translucence processing is displayed on the live view image. Thus, it is possible to achieve a simple configuration and to assist such that images for displaying the stereoscopic view can be captured. For displaying the stereoscopic view, the optimum movement distance of the viewpoint between the right image and the left image is displayed as a guide, it is possible to assist such that images for displaying the stereoscopic view can be captured.

If an image for displaying the stereoscopic view is captured by a multi-eye camera in a state where the distance to the object is short, the parallax amount cannot be adjusted, and an image which cannot be displayed in stereoscopic view is generated. Thus, when the distance to the object is short, the single eye mode is executed in which an image for displaying the stereoscopic view is generated on the basis of images captured by twice photographing, making it possible to capture an image for displaying the stereoscopic view. The movement to the photographing point of the second right image is assisted, making it possible for a person who is unfamiliar with photographing of an image for displaying the stereoscopic view to capture an image for displaying the stereoscopic view without making a mistake.

Although in the first embodiment, a case has been described where the invention is applied to a multi-eye camera, the invention is not limited thereto and may be applied to a single eye camera. In this case, in the stereoscopic-view image photographing processing routine of FIG. 5, the determination in Step 104 may not be carried out, and only the processing in the single eye mode in Steps 120 to 134 may be performed.

Next, a second embodiment will be described. The configuration of a multi-eye digital camera of the second embodiment is the same as the multi-eye digital camera 1 of the first embodiment. Thus, the same parts are represented by the same reference numerals, and description thereof will be omitted.

The second embodiment is different from the first embodiment in that, in the single eye mode, a difference from a current movement amount is displayed along with an optimum movement amount.

In the multi-eye digital camera of the second embodiment, the movement amount computation unit 33 computes an optimum movement distance between the viewpoint of the left image and the viewpoint of the right image at the time of photographing in the single eye mode, and computes the movement distance between the viewpoint when the left image is captured and the current viewpoint as follows.

First, differential processing in the X direction (horizontal direction) is performed for the background region of the left image and the background region of the live view image. A known method in the related art may be used to determine which of the longitudinal direction and the lateral direction of the image is the horizontal direction.

The feature points are calculated from the background regions of the left image and the live view image subjected to the differential processing. Next, the movement amount of the image when the feature points coincide with each other between the background region of the left image and the background region of the live view image is computed. The movement distance between the viewpoint when the left image is captured and the current viewpoint is computed on the basis of the computed movement amount of the image and the distance to the background measured by the distance measurement unit 31 in accordance with the principle of triangulation.

The movement amount computation unit 33 computes the difference between the optimum movement distance and the current movement distance, and outputs the difference to the display control unit 28. the display control unit 28 displays the difference in the movement distance to be superimposed on the live view image of the liquid crystal monitor 7.

The movement amount computation unit 33 is an example of a movement distance calculation unit and a current movement distance calculation unit.

Figure 6:
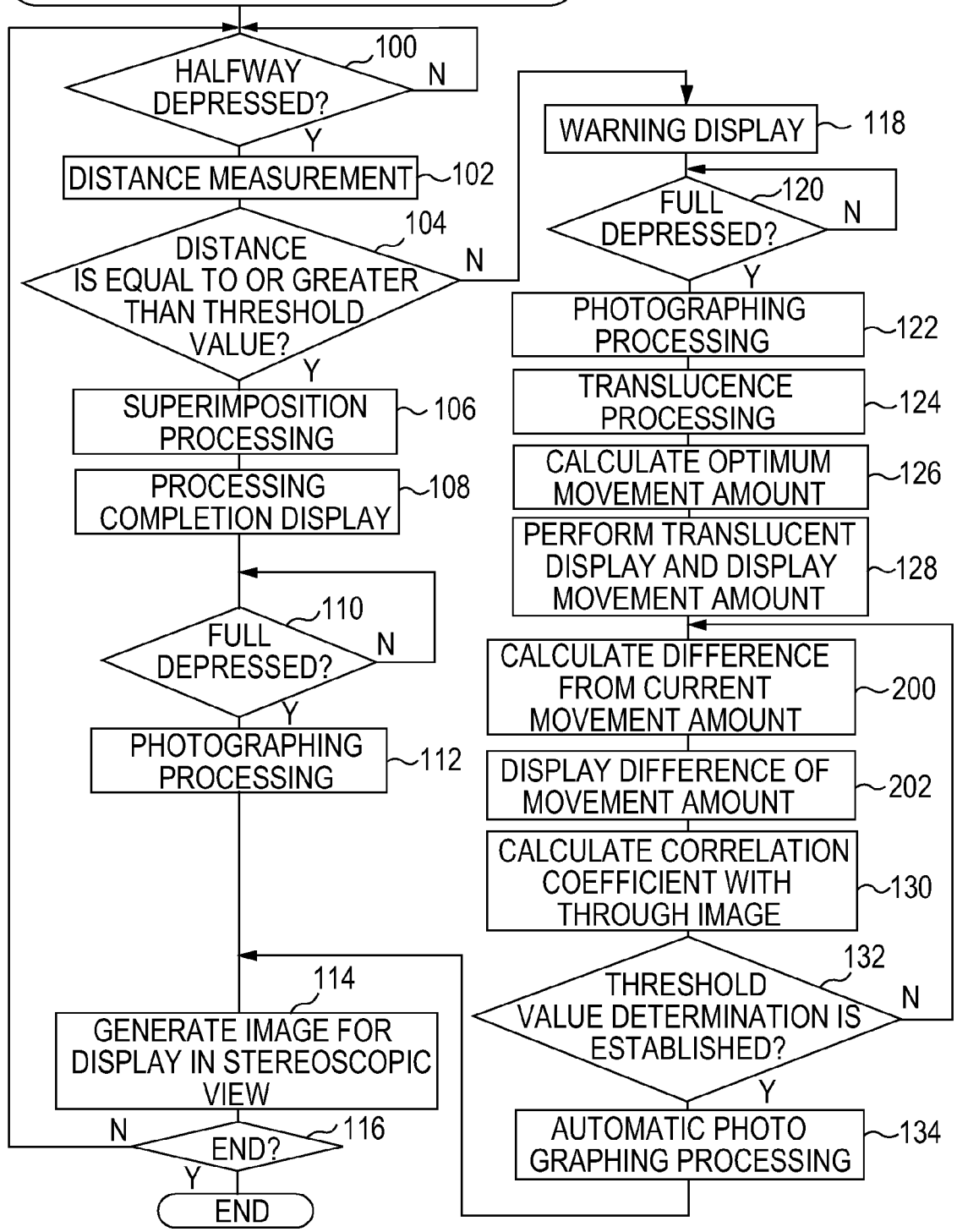
FIG. 6 is a flowchart showing the content of a stereoscopic-view image photographing processing routine according to a second embodiment.

A stereoscopic-view image photographing processing routine in the multi-eye digital camera of the second embodiment will be described with reference to FIG. 6. The same steps as those in the stereoscopic-view image photographing processing routine of the first embodiment are represented by the same reference numerals, and description thereof will be omitted.

In Step 100, it is determined whether or not the release button 2 is half pushed, and in Step 102, the distance to the object and the distance to the background are measured. In Step 104, it is determined whether or not the measured distance to the object is equal to or greater than a threshold value. When the distance to the object is equal to or greater than the threshold value, in Step 106, superimposition processing is performed for the pre images acquired by the photographing units 21A and 21B. If the superimposition processing is completed, in Step 108, a message indicating processing completion is displayed on the monitor 7.

In Step 110, it is determined whether or not the release button 2 is full pushed. In Step 112, an instruction of normal photographing is issued such that the photographing unit 21A captures the normal image of the left image and the photographing unit 21B captures the normal image of the right image, and the left image and the right image captured by the photographing units 21A and 21B are acquired. In Step 114, an image for displaying the stereoscopic view is generated on the basis of the left image and the right image, and stored in the recording medium 29.

In Step 116, it is determined whether or not photographing ends. When photographing does not end, the process returns to Step 100, and next photographing is prepared. Meanwhile, when photographing ends, the stereoscopic-view image photographing processing routine ends.

In Step 104, when it is determined that the distance to the object is smaller than the threshold value, in Step 118, a warning message indicating that photographing is carried out in the single eye mode is displayed on the liquid crystal monitor 7.

In Step 120, it is determined whether or not the release button 2 is full pushed. In Step 122, an instruction of normal photographing is issued such that the photographing unit 21A captures the normal image of the left image, and the left image captured by the photographing unit 21A is acquired. Next, in Step 124, translucence processing is performed for the acquired left image. In Step 126, the optimum movement distance of the viewpoint between the left image and the right image is computed. In Step 128, the left image subjected to the translucence processing and the optimum movement distance are superimposingly displayed on the live view image of the liquid crystal monitor 7.

Next, in Step 200, the current live view image is acquired from the photographing unit 21A, the current movement distance is calculated on the basis of the left image acquired in Step 122 and the current live view image, and the distance from the optimum movement distance calculated in Step 128 is calculated.

In Step 202, the difference from the optimum movement distance calculated in Step 200 is displayed to be superimposed on the live view image of the liquid crystal monitor 7.

Next, in Step 130, the correlation coefficient of the object region and the correlation coefficient of the background region are calculated. In Step 132, it is determined whether or not the calculated correlation coefficient of the object region is equal to or greater than a first threshold value and the correlation coefficient of the background region is equal to or smaller than a second threshold value. When the threshold value determination is negative, the process returns to Step 200. Meanwhile, if the threshold value determination is positive, in Step 134, an instruction of normal photographing is issued such that the photographing unit 21A captures the normal image of the right image, and the right image captured by the photographing unit 21A is acquired. Next, the process progresses to Step 114.

As described above, according to the multi-eye digital camera of the second embodiment, as the guidance information for guiding the capturing of the second right image, for displaying the stereoscopic view, the difference between the optimum movement distance of the viewpoint between the right image and the left image and the current movement distance is displayed, making it possible to assist to capture an image for displaying the stereoscopic view.

How much the optimum photographing point of the second right image is moved from the viewpoint of photographing of the first left image is displayed and assisted, thereby preventing failure of photographing.

Although in the second embodiment, a case has been described where the difference from the optimum movement distance is displayed, the invention is not limited to thereto, and the current movement distance and the optimum movement distance may be superimposingly displayed on the live view image.

Although in the second embodiment, a case has been described where the invention is applied to a multi-eye camera, the invention is not limited thereto, and may be applied to a single eye camera. In this case, in the stereoscopic-view image photographing processing routine of FIG. 6, the determination in Step 104 may not be carried out, and only the processing in the single eye mode in Steps 120 to 134 may be performed.

Next, a third embodiment will be described. The configuration of a multi-eye digital camera of the third embodiment is the same as the multi-eye digital camera 1 of the first embodiment. Thus, the same parts are represented by the same reference numerals, and description thereof will be omitted.

The third embodiment is different from the first embodiment in that, in the single eye mode, the correlation coefficient to the live view image in the horizontal direction is calculated, threshold value determination is carried out, and photographing of the right image is carried out.

In the multi-eye digital camera of the third embodiment, the consistency determination unit 35 determines the horizontal direction of the camera when the left image is captured, that is, which of the longitudinal direction and the lateral direction of the left image is the horizontal direction. A known method in the related art may be used to determine which of the longitudinal direction and the horizontal direction on the image is the horizontal direction.

The consistency determination unit 35 performs primary differential processing (or secondary differential processing)

in the X direction (horizontal direction) for the left image captured in the single eye mode and the live view image, calculates the correlation coefficient between the object regions of the left image and the live view image subjected to the differential processing, and calculates the correlation coefficient between the background region of the left image and the background region of the live view image. Thus, the correlation coefficient in the horizontal direction between the left image and the live view image is calculated for each of the object region and the background region.

When the calculated correlation coefficient of the object region is equal to or greater than a first threshold value and the calculated correlation coefficient of the background region is equal to or smaller than a second threshold value, the consistency determination unit 35 instructs the photographing control unit 22 to capture the right image. Thus, the photographing control unit 22 issues an instruction of normal photographing such that the photographing unit 21A captures the normal image of the right image.

The consistency determination unit 35 is an example of a correlation information calculation unit and a horizontal direction determination unit.

Figure 7:
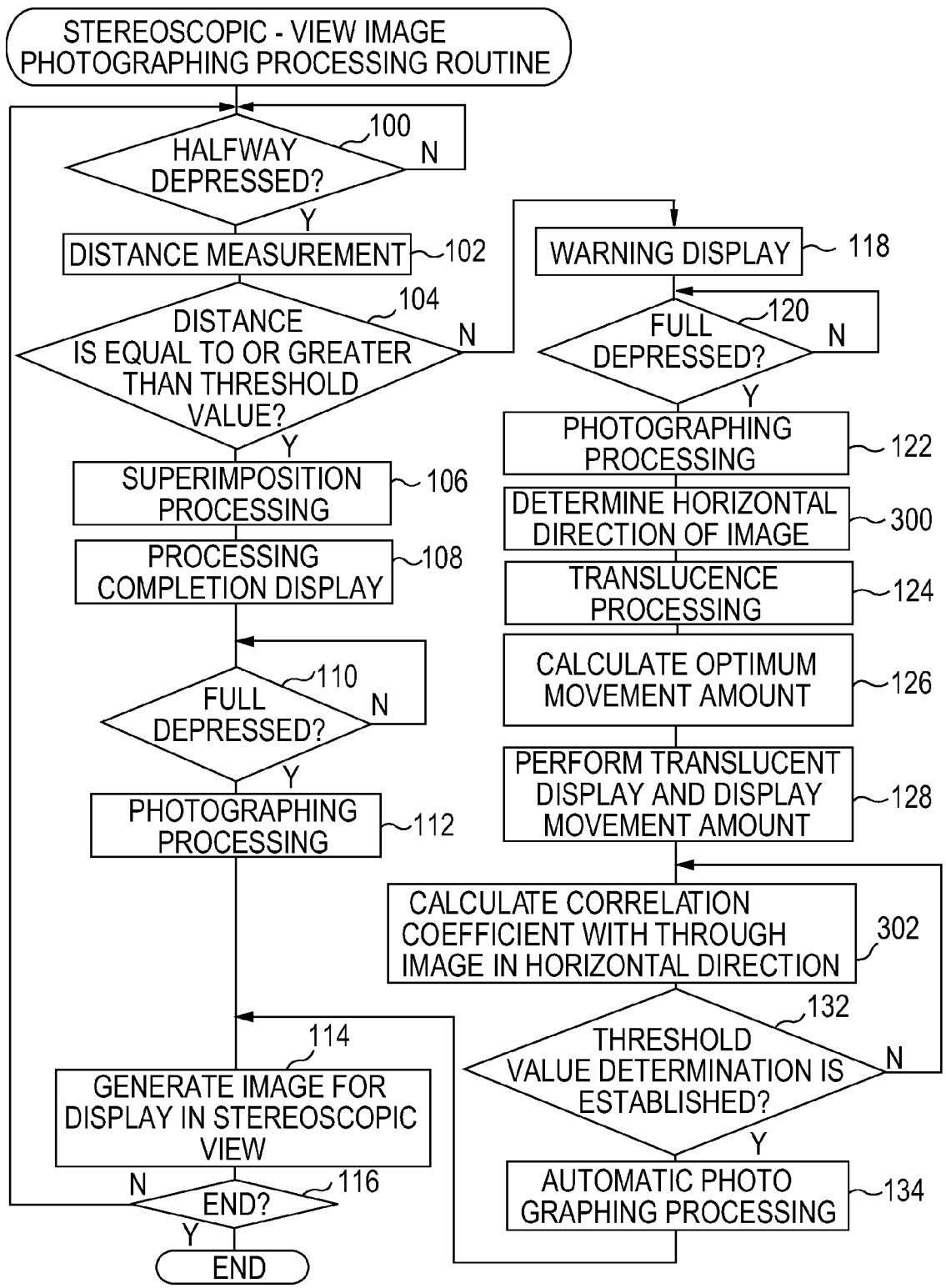
FIG. 7 is a flowchart showing the content of a stereoscopic-view image photographing processing routine according to the second embodiment.

A stereoscopic-view image photographing processing routine in the multi-eye digital camera of the third embodiment will be described with reference to FIG. 7. The same steps as those in the stereoscopic-view image photographing processing routine of the first embodiment are represented by the same reference numerals, and description thereof will be omitted.

In Step 100, it is determined whether or not the release button 2 is half pushed and in Step 102, the distance to the object and the distance to the background are measured. In Step 104, it is determined whether or not the measured distance to the object is equal to or greater than a threshold value. When the distance to the object is equal to or greater than the threshold value, in Step 106, superimposition processing is performed for the pre images captured by the photographing units 21A and 21B. If the superimposition processing is completed, in Step 108, a message indicating processing completion is displayed on the monitor 7.

In Step 110, it is determined whether or not the release button 2 is full pushed. In Step 112, an instruction of normal photographing is issued such that the photographing unit 21A captures the normal image of the left image and the photographing unit 21B captures the normal image of the right image, and the left image and the right image captured by the photographing units 21A and 21B are acquired. In Step 114, an image for displaying the stereoscopic view is generated on the basis of the left image and the right image, and stored in the recording medium 29.

In Step 116, it is determined whether or not photographing ends. When photographing does not end, the process returns to Step 100, and next photographing is prepared. Meanwhile, if photographing ends, the stereoscopic-view image photographing processing routine ends.

In Step 104, when it is determined that the distance to the object is smaller than the threshold value, in Step 118, a warning message indicating that photographing is carried out in the single eye mode is displayed on the liquid crystal monitor 7.

In Step 120, it is determined whether or not the release button 2 is full pushed. In Step 122, an instruction of normal photographing is issued such that the photographing unit 21A captures the normal image of the left image, and the left image captured by the photographing unit 21A is acquired. Next, in Step 300, the horizontal direction of the camera when the left image is captured in Step 122 is detected, and it is determined which of the longitudinal direction and the lateral direction of the left image is the horizontal direction.

In Step 124, translucence processing is performed for the acquired left image. In Step 126, an optimum movement distance of the viewpoint between the left image and the right image is computed. In Step 128, the left image subjected to the translucence processing and the optimum movement distance are superimposingly displayed on the live view image of the liquid crystal monitor 7.

Next, in Step 302, the current live view image is acquired from the photographing unit 21A, and differential processing in a direction as the horizontal direction determined in Step 300 is performed for the current live view image and the left image acquired in Step 122, thereby calculating the correlation coefficient of the object region and the correlation coefficient of the background region. In Step 132, it is determined whether or not the calculated correlation coefficient of the object region is equal to or greater than the first threshold value and the correlation coefficient of the background region is equal to or smaller than the second threshold value. When the threshold value determination is negative, the process returns to Step 132. Meanwhile, if the threshold value determination is positive, in Step 134, an instruction of normal photographing is issued such that the photographing unit 21A captures the normal image of the right image, and the right image captured by the photographing unit 21A is acquired. Next, the process progresses to Step 114.

As described above, according to the multi-eye digital camera of the third embodiment, threshold value determination is carried out by using the correlation coefficient in the horizontal direction, thereby easing the conditions for automatic photographing of the second right image. Thus, it is possible to prevent the occurrence of a situation in which it is difficult to lower the shutter for photographing the second right image, and the second right image cannot be captured. With focusing on the feature (correlation coefficient) in the horizontal direction rather than the vertical direction, it is possible to carry out photographing for displaying the stereoscopic view without damaging the stereoscopic effect.

Although in the third embodiment, a case has been described where the invention is applied to a multi-eye camera, the invention is not limited thereto, and may be applied to a single eye camera. In this case, in the stereoscopic-view image photographing processing routine of FIG. 7, the determination of Step 104 may not be carried out, and only the processing in the single eye mode in Steps 120 to 134 may be performed.

A method of photographing a right image by threshold value determination using the correlation coefficient in the horizontal direction in the single eye mode may be applied to the second embodiment.

Although in the first to third embodiments, a case has been described where the distance to each of the object region and the background region is measured from the focusing position determined by the AF processing unit, the invention is not limited. The distance to each of the object region and the background region may be measured by stereo matching of the images obtained from the photographing units 21A and 21B. With regard to the distance to the background region, a predefined value may be used.

Although a case has been described where, in the single eye mode, the left image is set as the first image and the right image is set as the second image, the right image may be set as the first image and the left image may be set as the second image. Three or more images may be acquired to generate an image for display in stereoscopic image. In this case, in capturing a third image or later, the same guidance information as in the second image may be displayed on the live view image to assist photographing.

The stereoscopic-view image photographing processing routine of each of the first to third embodiments may be embodied as a program, and the program may be executed by a CPU.

What is claimed is:

1. A multi-eye photographing apparatus comprising:
   a photographing unit which captures a plurality of images from a plurality of different viewpoints;
   a first photographing control unit which controls the photographing unit so as to capture a first image for displaying a stereoscopic view from one viewpoint among the plurality of viewpoints;
   a distance measurement unit which measures a camera distance to an object in the first image;
   a movement distance calculation unit which calculates, on the basis of the distance from the object measured by the distance measurement unit, the movement distance of the viewpoint between a first image and a second image for displaying the stereoscopic view on the basis of the first image and the second image, which is captured from the one viewpoint as a viewpoint different from the first image; and
   a display control unit which controls such that, as guidance information for guiding the capturing of the second image, at time of image capture, an instruction to move the photographing unit is displayed on a through view image, which is displayed by a display unit displaying images, on the basis of the movement distance of the viewpoint calculated by the movement distance calculation unit.

2. The multi-eye photographing apparatus according to claim 1,
   wherein the display control unit controls such that, as the guidance information, the first image is subjected to translucence processing and is displayed on the through view image.

3. The multi-eye photographing apparatus according to claim 1, further comprising:
   a current movement distance calculation unit which calculates the movement distance between the viewpoint and the current viewpoint in the first image on the basis of the first image and the current through view image,
   wherein the display control unit controls such that, as the guidance information, the difference between the current movement distance calculated by the current movement distance calculation unit and the movement distance of the viewpoint calculated by the movement distance calculation unit or the difference between the movement distance of the viewpoint and the current movement distance is displayed on the through view image.

4. The multi-eye photographing apparatus according to claim 1, further comprising:
   a correlation information calculation unit which calculates correlation information between an object portion in the first image and an object portion in the through view image, and calculates correlation information between a background portion different from the object portion in the first image and a background portion in the through view image; and
   a second photographing control unit which, when the correlation information between the object portions calculated by the correlation information calculation unit is equal to or greater than a first threshold value and the correlation information between the background portions is equal to or smaller than a second threshold value, controls the photographing unit to capture the second image.

5. The multi-eye photographing apparatus according to claim 4, further comprising:
   a horizontal direction determination unit which determines a horizontal direction in the first image,
   wherein the correlation information calculation unit calculates the correlation information in the horizontal direction determined by the horizontal direction determination unit.

6. The multi-eye photographing apparatus according to claim 1,
   wherein the display unit displays the first image and the second image in stereoscopic view.

7. The multi-eye photographing apparatus according to claim 1, further comprising:
   a distance measurement unit which measures distance information to an object in each of the plurality of images; and
   a third photographing control unit which, when the measured distance information is equal to or greater than a threshold value, causes the photographing unit to capture the plurality of images from the plurality of viewpoints,
   wherein, when the measured distance information is smaller than the threshold value, the first photographing control unit controls the photographing unit to capture the first image, and
   when the first image is captured, the display control unit controls such that the guidance information is displayed on the through view image, which is displayed by the display unit.

8. The multi-eye photographing apparatus according to claim 7,
   wherein the display unit displays the plurality of images or the first image and the second image captured by the photographing unit in stereoscopic view.

9. A non-transitory computer-readable medium embodied with a program which causes a computer to function as:
   a first photographing control unit which controls a photographing unit, which captures a plurality of images from a plurality of different viewpoints, to capture a first image for displaying a stereoscopic view from one viewpoint among the plurality of viewpoints;
   a distance measurement unit which measures a camera distance to an object in the first image;
   a movement distance calculation unit which calculates, on the basis of the distance from the object measured by the distance measurement unit, the movement distance of the viewpoint between a first image and a second image for displaying the stereoscopic view on the basis of the first image and the second image, which is captured from the one viewpoint as a viewpoint different from the first image; and
   a display control unit which controls such that, as guidance information for guiding the capturing of the second image, at a time of image capture, an instruction to move the photographing unit is displayed on a through view image, which is displayed by a display unit displaying images, on the basis of the movement distance of the viewpoint calculated by the movement distance calculation unit.

* * * * *